July 23, 1968 J. A. GARCIA 3,393,449

METHOD OF ASSEMBLY OF RESISTOR MATRIX

Filed Nov. 1, 1963 2 Sheets-Sheet 1

INVENTOR.
JULIAN A GARCIA
BY [signature]
ATTORNEY

July 23, 1968 J. A. GARCIA 3,393,449

METHOD OF ASSEMBLY OF RESISTOR MATRIX

Filed Nov. 1, 1963 2 Sheets-Sheet 2

United States Patent Office 3,393,449

Patented July 23, 1968

3,393,449

METHOD OF ASSEMBLY OF RESISTOR MATRIX

Julian Alonso Garcia, Raleigh, N.C., assignor to International Telephone and Telegraph Corporation, a corporation of Delaware Filed Nov. 1, 1963, Ser. No. 320,673
9 Claims. (Cl. 29—626)

This invention relates in general to an improved method of manufacture of component assemblies and in particular to component matrices.

Component matrices usually consist of a plurality of components arranged in horizontal and vertical rows with the terminal or terminals at one end of each component being secured to a lower plate and the terminal or terminals at the other end of each component being secured to an upper plate. Each plate usually has a plurality of parallel conductors thereon and the plates are arranged to provide intersecting rows and columns so that any particular component or components can be selected at the crosspoint of each row and column.

Prior-art component matrices are known which utilize an upper and a lower printed circuit board each having a plurality of printed conductors thereon. The boards are spaced apart with the conductors of one board extending at right angles to the conductors of the other board and with the components being mounted between the two boards.

In manufacturing these known matrices, all components are positioned with one of their terminals passing through apertures in the lower board. Thereafter, the upper board is placed in alignment with the assembly so that the upper terminals of the components pass through apertures in the upper board. The terminals on the components in entire assembly are then soldered. This method of assembly requires a large board and oversized apertures so that any misalignment of the components can be readily rectified. Since space is needed between each component for alignment purposes, the matrix unit is quite large. Examples of known matrices containing four hundred elements manufactured by this method have dimensions in excess of eight inches in both planar directions.

Other known methods permit fabrication of a matrix which is more compact than those above described. However, these matrices require expensive jigs to procure the noted alignment. One such example would be the use of two comb-shaped adjusting tools positioned at right angles to each other to insure the alignment of the terminals. Obviously, a bent terminal would cause delays and possibly several non-soldered connections.

In addition to these noted disadvantages, both of the matrices manufactured by these described methods have the further disadvantage that the repair of a defective matrix by replacing a component may require a complete disassembly of the matrix or else the destruction of the upper or lower printed circuit board in cutting out the portion containing the defective component.

The foregoing disadvantages are overcome by the present invention in which each row of components is fabricated separately thereby eliminating the need for critical alignment. Also, repair of such matrix is enhanced since each component can be removed readily without disassembly of the entire matrix. This is accomplished by soldering the upper terminals of each component to a solid conductor extending across the board. To repair a matrix constructed according to applicant's novel method, the row conductor can be severed to remove the defective component and thereafter readily bridged when the new component is positioned. Thus, a primary object of the invention is to provide an improved method of manufacture of matrices composed of a large number of small components arranged in closely spaced rows and columns.

A more specific object of the invention is to provide an improved method of manufacture of compact component matrices in which only normal manufacture tolerances are required.

Another object is to provide an improved method of manufacture of compact component matrices in which the need for expensive jigs and highly skilled assemblers is obviated.

Still another object is to provide an improved method of manufacture of compact components matrices by assembling each row of the matrix separately but in a manner that results in a sturdy assembly comparable to matrices manufactured by other known methods.

A further object resides in the method of manufacture of compact component matrices which enhances the removal and replacement of defective components after fabrication.

A still further object resides in the method of manufacture of compact components matrices which is more reliable and economical than heretofore known methods.

Another object and features of the invention will become apparent as the description progresses. While the apparatus and methods hereinafter described are effectively adapted to fulfill the stated objects and features, it is to be understood I do not intend to confine my invention to the particular preferred embodiment disclosed since it is subject to various modifications without departing from the spirit of my invention.

Referring now to the accompanying drawings:

FIG. 1 illustrates a compact components matrix constructed in accordance with the present invention;

FIGS. 2 through 10 disclose the steps followed in manufacturing the matrix of FIG. 1; and FIGS. 11 through 13 disclose the steps involved in removing and replacing a defective component without disassembling the entire matrix.

Referring now to FIG. 1, the inventive matrix comprises a printed circuit board 1 having $n$ columns of printed circuit strips or conductors C secured to the underside of the board, with each conductor terminating at a different pin terminal, such as PL, of plug PL1. The board 1 contains $m$ rows each containing $n$ apertures A extending through the board and through the immediately underlying printed conductors C. Each row also includes an aperture AX which extends through the board in direct alignment with printed circuitry conductors D which are terminated at respective terminals, such as terminal P2, in plug PL2.

While any number of suitable dimensions could be used for the printed board 1 and any suitable member of rows and columns of printed circuit conductors could be provided, one embodiment utilizes 24 rows and 24 columns arranged in a board having width and depth dimensions of approximately 4 inches each. Thus, 476 components may be mounted on a very small board.

The matrix shown in FIG. 1 is shown in partially completed form in order to permit a simplified description of the invention. In its completed form, the top portion of a completed matrix will comprise a substantially flat surface parallel to the board 1, this surface being composed of a series of printed circuit slats S extending across the board and lying in abutting relationship with one another. Since each strip or slat S rests against the immediately preceding slat and against the top of the components in its associated row, a very sturdy matrix is formed.

Generally, the steps in the method of manufacture are as follows: The apertures in the printed circuit board are marked according to a coding, if desired, such marking being accomplished by silk-screening certain apertures or by placing the board on a pin-type jig in which the apertures to be left unoccupied by components are plugged by the jig pins. As an alternative, the aperture can be according to a predetermined code. Thereafter, an assembler places the lower terminals of a component such as R, in each of the marked or vacant apertures. This results in a partially manufactured product comprising a printed circuit board supporting a plurality of components having their terminals extending through the board in close association with the printed circuit conductors C. Also, a plurality of circuit wires W are placed in respective apertures AX. The entire assembly is then passed over a soldering machine and the terminals extending through the board are soldered to the column conductors C. Of course this operation could be accomplished by hand soldering.

The assembler then places a printed circuit strip or slat S with the printed conductors upward, on top of the components in the first row and bends the upper terminals of the components until they rest on the printed conductor of the slat S. At the same time, the circuit wire W of the same row is likewise bent. The assembler then solders the terminals and circuit wire to the conductors on the printed circuit slat S. In this manner, each pin such as P2 of plug PL2 is associated with a separate pin P1 of plug PL1 through a component connected between the slat S and the board 1.

After completion of soldering of the first slat, a second slat is placed against the top of the components in the second row and against the previously soldered slat of the first row. The terminals and circuit wire are then bent and soldered as before described.

The remainder of the slats are successively placed in position and soldered, all in the manner hereinbefore described.

When all slats are soldered, the entire assembly may be passed over a grinding wheel to remove all excess terminals and to grind a flat surface. Alternatively, the terminals could be hand-cut when the unit is completed and assembled, or hand cut when each slat is soldered.

Thus, it can be seen that this described method of manufacture eliminates a number of critical spacing operations before required in the assembly of a similar matrix.

FIGS. 2 through 10 show a side view of a portion of the printed circuit board 1 setting out the above described steps in detail.

In FIG. 2, the components, such as R, are moved downwardly toward board 1 so that the terminals of the components pass through corresponding apertures A and assume a position as shown in FIG. 3. These components can be so positioned whether individually or in groups depending on the dexterity of the assembler.

Figure 1:
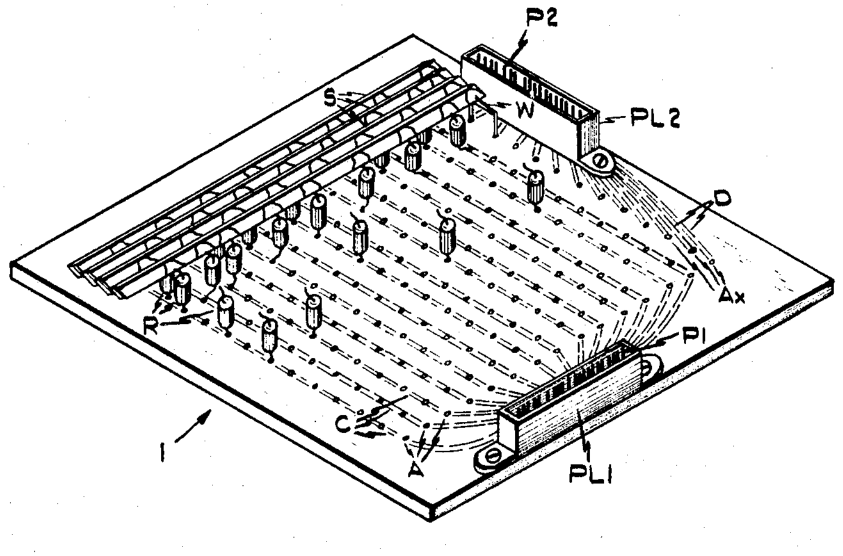
Figure 2:
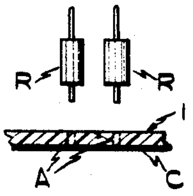
Figure 3:
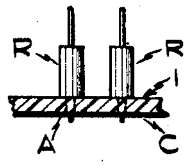
Figure 4:
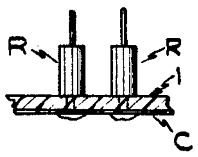
FIG. 4 shows several components after the entire board has been passed through a soldering machine.
Figure 5:
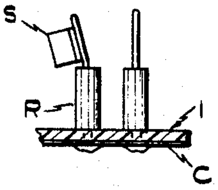
FIG. 5 shows a slat S positioned above the components in one row with the terminals bent into abutting relationship with the metallic portion of slat S.
Figure 6:
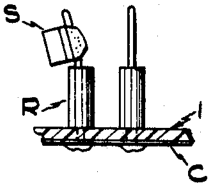
FIG. 6 shows one of the components with its free terminals soldered to the slat S.
Figure 7:
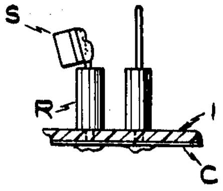
FIG. 7 shows one component with the excess portion of its terminal removed. As before pointed out, this removal could be accomplished after the assembly is completely soldered.
Figure 8:
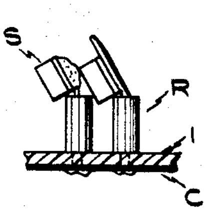
FIG. 8 shows a second slat S placed in position with respect to the components in the corresponding row. The terminal is shown bent in proper position for soldering.
Figure 9:
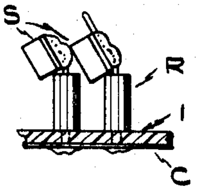
FIG. 9 shows the last-placed slat and terminal soldered together and FIG. 10 shows such assembly with the excess terminal removed.
Figure 10:
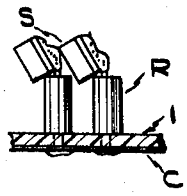
Figures 11, 12, 13:
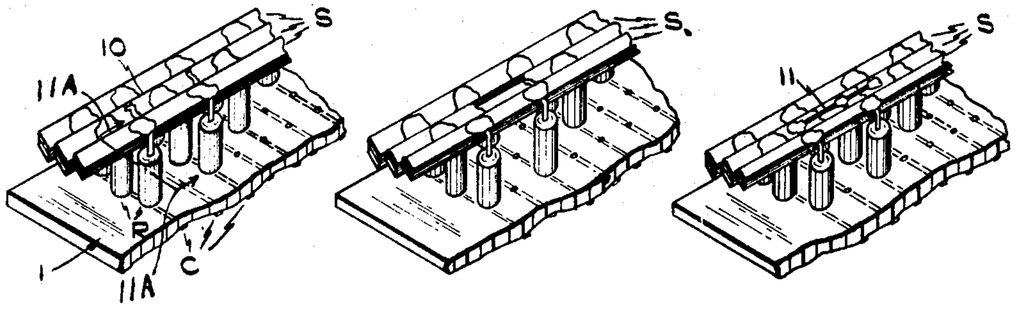
Figure 11A:
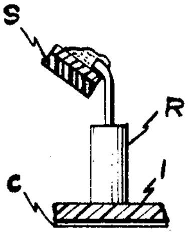

FIGS. 11 through 13 show various steps involved in removing a defective component and replacing it with a new component. A small cutter or nippers severs the slat S at each side of the soldered upper terminal of the defective component, thereby separating a section 10 from the remainder of the slat. Thereafter, the bottom terminal of the defective component is unsoldered and the component is removed. FIG. 12 shows the assembly with the defective component removed.

The terminal of a new component is inserted in the aperture previously occupied by the terminal of the defective component and is soldered in position. A conductor 11, shown in FIG. 12 is bridged across the opening created by the removal of the cut-out portion 10 of the slat and is soldered at each end to re-establish electrical continuity along the entire length of the slat. The terminal of the new component is then soldered to the intermediary portion of wire 11 to complete the repair of the matrix. While the bridging conductor is shown as a circular wire, it could be any one of a number of current conducting elements.

The configuration of the slats S and the components R could be of any one of a number of shapes and dimensions. Also, the terminals of the components could vary within wide limits without departing from the invention.

While I have described my invention in conjunction with specific apparatus and applications, it is to be understood that this description is made only by way of example and not as a limitation on the scope of the invention.

I claim:

1. The method of manufacture of an assembly comprising a plurality of multi-terminal electrical components mounted between upper and lower electrical insulating support elements each having electrical conductive material thereon comprising the steps of; placing said plurality of components on one side of said lower support element and securing and electrically connecting at least one terminal of each component to the conducting material on at least one side thereof; placing first upper support element in abutting relation with at least one terminal of each of a plurality of the placed components so that the components are substantially between the upper support element and said one side of said lower support element and securing and electrically connecting the last-said terminals to said conducting material on said first upper support element; and successively repeating the last-said step to secure and electrically connect at least one terminal of each component or other of the placed components to conductive material on another upper support element, each step succeeding the connection of the first upper element including positioning the next upper support element in abutting and electrically insulating relation with the immediately preceding upper support element.

2. A method as set forth in claim 1 including the additional steps of adding a component to a finished assembly by: removing a portion of an upper support element; placing the last-said component through the opening created by said removed portion; electrically connecting at least one terminal of the last-said component to said lower support element; electrically bridging the said opening; and connecting at least one terminal of the last-said component to said bridged upper support element.

3. A method as set forth in claim 1 including additional steps for removing a component from a finished assembly and substituting another component therefor, comprising the steps of; removing a portion of the upper support element connected to a terminal of the component to be removed; disconnecting the last-said component from the lower support element; removing the last-said component from the said matrix by passing it through the opening created by said removed portion; placing a new component through the said opening; electrically connecting at least one terminal thereof to said lower support element; electrically bridging the said opening; and connecting at least one terminal of the new component to the bridged upper support element.

4. A method as set forth in claim 1 wherein said components are placed on said lower support element by passing at least one terminal thereof through apertures provided in said lower support element.

5. A method as set forth in claim 4 wherein said components are electrically connected to said lower support element by soldering the portion of each terminal passing through said apertures to the said electrical conductive material on said lower support element.

6. A method as set forth in claim 1 wherein the said components are arranged in parallel rows on said lower support element and wherein each said upper support element is electrically connected to at least one terminal of all of said components in one row.

7. A method as set forth in claim 6 wherein the said components in each said row are spaced in coded relationship along said row.

8. A method as set forth in claim 1 wherein the said upper support elements are positioned at an angle with respect to the said components.

9. A method as set forth in claim 1 wherein said upper support elements comprise an insulating slat having one side coated with said electrical conductive material and wherein said slats are positioned to insulate the said material on one slat from the said material on adjacent slats.

References Cited

UNITED STATES PATENTS

| | | | |
|---|---|---|---|
| 3,065,385 | 11/1962 | Mierendorf | 29—155.5 X |
| 3,162,788 | 12/1964 | Allen et al. | 317—101 |
| 3,216,089 | 11/1965 | Dettman | 29—155.55 |

FOREIGN PATENTS

| | | |
|---|---|---|
| 606,581 | 10/1960 | Canada. |

OTHER REFERENCES

"Electronics" publication, November 1954 edition, pages 154–158.

JOHN F. CAMPBELL, *Primary Examiner.*

R. CHURCH, *Assistant Examiner.*